United States Patent [19]

Gallagher et al.

[11] Patent Number: 6,104,875
[45] Date of Patent: Aug. 15, 2000

[54] METHOD FOR FIELD PROGRAMMING AN INDUSTRIAL PROCESS TRANSMITTER

[75] Inventors: Joseph M. Gallagher, North Wales; Mark A. Small, Downingtown; Pamela E. Gehman, North Wales, all of Pa.

[73] Assignee: Honeywell Inc., Minneapolis, Minn.

[21] Appl. No.: 08/993,769

[22] Filed: Dec. 18, 1997

[51] Int. Cl.⁷ .................................................. G06F 13/14
[52] U.S. Cl. ............................................................ 395/712
[58] Field of Search ............................................ 395/712

[56] References Cited

U.S. PATENT DOCUMENTS

| | | | |
|---|---|---|---|
| 4,680,753 | 7/1987 | Fulton et al. | 370/449 |
| 4,737,770 | 4/1988 | Brunius et al. | 340/539 |
| 4,935,863 | 6/1990 | Calvas et al. | 364/138 |
| 5,083,288 | 1/1992 | Somlyody et al. | 702/116 |
| 5,187,474 | 2/1993 | Kielb et al. | 340/870.18 |
| 5,418,524 | 5/1995 | Fennell | 340/825.22 |
| 5,420,578 | 5/1995 | O'Brien et al. | 340/870.13 |
| 5,553,297 | 9/1996 | Yonezawa et al. | 364/147 |
| 5,579,522 | 11/1996 | Christeson et al. | 395/652 |
| 5,642,301 | 6/1997 | Warrior et al. | 364/571.02 |
| 5,682,476 | 10/1997 | Tapperson et al. | 370/225 |
| 5,727,215 | 3/1998 | Rynajki et al. | 395/712 |
| 5,732,333 | 3/1998 | Cox et al. | 455/126 |
| 5,754,596 | 5/1998 | Bischoff et al. | 375/295 |
| 5,764,891 | 6/1998 | Warrior | 395/200.2 |
| 5,764,928 | 6/1998 | Lanctot | 395/285 |
| 5,793,963 | 8/1998 | Tapperson et al. | 395/200.31 |
| 5,819,050 | 10/1998 | Boehling et al. | 710/104 |
| 5,841,654 | 11/1998 | Verissimo et al. | 364/188 |
| 5,859,878 | 1/1999 | Phillips et al. | 375/316 |
| 5,867,714 | 2/1999 | Todd et al. | 395/712 |
| 5,872,810 | 2/1999 | Phillips et al. | 375/222 |
| 5,890,015 | 3/1999 | Garney et al. | 395/882 |

OTHER PUBLICATIONS

Atwater et al., Wireless ATM, 1996, p. 235–243.
Leung et al., A Wireless Local Area Network Employing Distributed Radio Bridges, 1993, p. 97–107.
Bennington et a., Wireless Andrew . . . , 1997, p. 55–65.
Pahlavan, Wireless Interoffice Networks, 1988, 277–302.
Fisher–Rosemount Product Data Sheet, Model RFT9712 Mass Flow and Density Transmitter, May 1995.
Fisher–Rosemount Product Data Sheet, Hart Communicator, Nov. 1996.
Fisher–Rosemount Product Data Sheet, ProLink Software, Aug. 1996.
Internet Web Pages located at http://www.ccsi.com/hart which describe the Hart Protocol, Jan. 1999.
International Search Report, Jan. 8, 1999.

*Primary Examiner*—Eric W. Stamber
*Assistant Examiner*—John Chavis
*Attorney, Agent, or Firm*—Anthony Miologos

[57] ABSTRACT

A method is disclosed for altering in the field the operating instructions used by an industrial process transmitter to collect, manipulate and transmit output signals representing the state of an industrial process. The method is used with an industrial process transmitter that includes at least one alterable storage device that has a first set of operating instructions stored therein. A controller device is connected to the alterable storage device and a configuration device is connectable to the industrial process transmitter via a communication link. The method includes entering a user-defined second set of operating instructions in the configurations device and then translating the second set of operating instructions into a format readable by the controller device. A communications link between the configuration and controller device is next established. On establishment of the communications link, the second set of operating instructions is transferred from the configuration device to the industrial process transmitter where they are stored in the alterable storage device, replacing the first set of operating instructions. The controller device then uses the second set of operating instructions to collect, manipulate and transmit output signals representing the state of the industrial process. Alternatively, the method can be used to alter in the field functional process routines or instructions that are used in the calculation of a derived output signal from the collected process signals. The functional process routines that are programmed into the alterable storage device can either replace previously-stored routines or add new functional routines to a previously-stored set.

12 Claims, 5 Drawing Sheets

METHOD FOR FIELD PROGRAMMING AN INDUSTRIAL PROCESS TRANSMITTER

CROSS-REFERENCE TO RELATED APPLICATIONS

The present application is related to co-pending application, Ser. No. 08/993,770 titled "A Field Programmable Industrial Process Transmitter"; filed on the same date herewith, and having a common assignee as the present invention.

FIELD OF THE INVENTION

This invention relates in general to process signal transmitters and, more specifically, to a method for programming a process signal transmitter with user-defined operating instructions and process-manipulating routines in the field.

BACKGROUND OF THE INVENTION

The present invention is used with devices known as "smart two-wire process transmitters" that must be set up or configured in one of a multitude of modes, depending on the application. Signal transmitters accept one form of various low-level signals from a sensor or transducer and convert such signals to a standard form known as a 4-to-20-mA current loop. Such transmitters are used in the process industries and are used for measuring temperature, pressure, flow, level and various other variables associated with the process (hereinafter referred to as a process variable).

Generally, to measure each of these different process variables a different design transmitter is required. Transmitters that are designed using classical analog circuit technology even require different models of transmitters depending on the range of the measured variable. Typically, a transmitter receives a low-level (microvolt and millivolt level) signal from thermocouples, pressure, flow, level and other sensors; converts these low-level signals near the location of the sensor to a suitable high-level signal, and transmits such high-level signal to a remote location within a process plant, such as the control room. Alternatively, the signals output can also be transmitted to a process control system associated with industrial process, that is used to monitor, collect and manipulate the process variables.

In recent years "smart" process transmitters have been introduced. These devices are distinguished from their analog predecessors by utilizing one or more microprocessors for their operation. These so-called smart transmitters easily implement digital communications with a digital terminal or other digital computer. All current smart two-wire transmitters offer some form of digital communication with either local terminals or to a process control systems central computer. Additionally, some smart two-wire transmitters include internally-stored programming instruction that manipulate in one form or another the process variables received from the sensors. This manipulation can be as simple as selecting a sensor or as complicated as deriving and transmitting to a process control system an output signal indicative of the product of an algorithmic calculation using the process values sensed.

Presently known smart transmitter's operating and configuration programs are normally stored in a Read Only Memory (ROM). The operating and configuration instructions loaded in the ROM characterize the process transmitter and defines its functionality. The term characterize is used in this invention to describe the character of the device. Or that which operationally distinguishes the process transmitter from other process transmitters, such as a transmitter that senses and transmits pressure signals from a transmitter that senses and transmits flow signals. The term functionality is defined as the operating behavior of the process transmitter within its character role, such as in a temperature transmitter, the frequency that a temperature sensor is polled by the transmitter to gather process variable data, or in a multi-variable transmitter, the algorithmic routines used to derive and calculate a manipulated variable from one or more process variables sensed and collected. The ROM is programmed and assembled into the transmitter at the time of manufacture. In order to change a transmitter's character and functionality, the transmitter has to be removed from the process, opened, and the ROM physically removed and replaced with a new ROM.

This has many undesirable consequences. First, the removal of the transmitter effectively stops the monitoring and collection of the variables associated with that portion of the process. If these process variables are critical to the product being produced, the loss of this information may necessitate the temporary shut-down of the manufacturing or industrial process. This may a have a negative economic impact on the manufacturer due to the loss of production and the cost of starting-up production again. Second, the opening of the transmitter and physical replacement of the ROM has inherent dangers in the potential damage to the electronic and electrical components and circuits of the device. Static electrical discharges and undo mechanical strain and other dangers associated with physically handling sensitive low-power electrical devices can leave these devices non-functional, requiring replacement of the damaged circuits or devices or replacement of the entire transmitter.

An apparatus for configuring a smart transmitter is taught by U.S. Pat. No. 5,083,288, to Somlyody et al. This invention teaches an apparatus for configuring a smart transmitter that uses switches to configure the transmitter to perform various functions. The transmitter includes a program and an apparatus for cycling through the program to set various conditions, including a range of operation and selection of one of many possible remote sensors. The program includes two portions, each of which can be entered by a user-manipulated switch. Each portion of the program can be cycled through, and as selected portions of the program are reached, a selected parameter can be set into the microprocessor as a permanent operating condition. The set operating conditions can be set or reset at any time by cycling through the program in accordance with the set protocol.

The apparatus and method described above has limitations in that any configuration programs that changes the functionality of the device has to be loaded initially into the transmitter at the time of manufacture, thereby limiting its functionality to the operating characteristics that have been previously loaded. Additionally, there are no provisions in the initial programming that can change the character of the transmitter.

SUMMARY OF THE INVENTION

Therefore, there is provided by the present invention a method for altering in the field the operating instructions used by an industrial process transmitter to collect, manipulate and transmit output signals that represent the state of an industrial process.

The method of the present invention is used with an industrial process transmitter that includes an alterable storage device that has a first set of operating instructions stored therein which characterizes the operation of the industrial process transmitter. A controller device connected to the alterable storage device is arranged to use the operating instructions stored in the alterable storage device to control the industrial process transmitter. A configuration device is arranged to accept a second set of operating instructions entered by a user and to establish a communications link between the configuration device and the controller device.

The method for altering the character of the industrial process transmitter is comprised of entering a user-defined second set of operating instructions in the configurations device and then translating the second set of operating instructions into a format readable by the controller device. A communications link between the configuration and controller device is next established. Upon establishment of the communication link, the second set of operating instructions is transferred from the configuration device to the industrial process transmitter, where they are stored in the alterable storage device, replacing the first set of operating instructions. The controller device then uses the second set of operating instructions to collect, manipulate and transmit output signals representing the state of the industrial process.

Alternatively, the method of the present invention can be used to alter in the field functional process routines or instructions, such as algorithm routines, that are used in the calculation of a derived output signal from the collected process signals. The functional process routines that are programmed into the alterable storage device can either replace previously-stored routines or add new functional routines to a previously-stored set.

The functional routines or instructions can be sent to the alterable storage device as complete algorithmic routines or converted by the configuration device into an executable sequence of subroutine calls that call predefined function subroutines stored in a memory associated with the controller device. The controller device affects the calculation of the algorithmic routine by accessing and executing a predefined function subroutine in accordance to the executable sequence of function subroutine calls stored in the alterable storage device.

Accordingly it is an object of the present invention to provide a method for field programming a process transmitter.

It is another object of the present invention to provide a method for downloading user-defined configuration data to a field programmable process transmitter from a configuration device in order to change the operating character and functionality of the process transmitter.

It is still another object of the present invention to provide a method for downloading user-defined custom algorithm subroutines that uses the downloaded custom algorithm subroutines along with previously-stored function routines and sensed process variables to develop output signals representing the state of an industrial process.

BRIEF DESCRIPTION OF THE DRAWINGS

Other objects, features, and advantages of the present invention will be apparent from the following description of a preferred embodiment thereof, taken in conjunction with the accompanying drawings, in which.

DETAILED DESCRIPTION OF THE INVENTION

Figure 1:
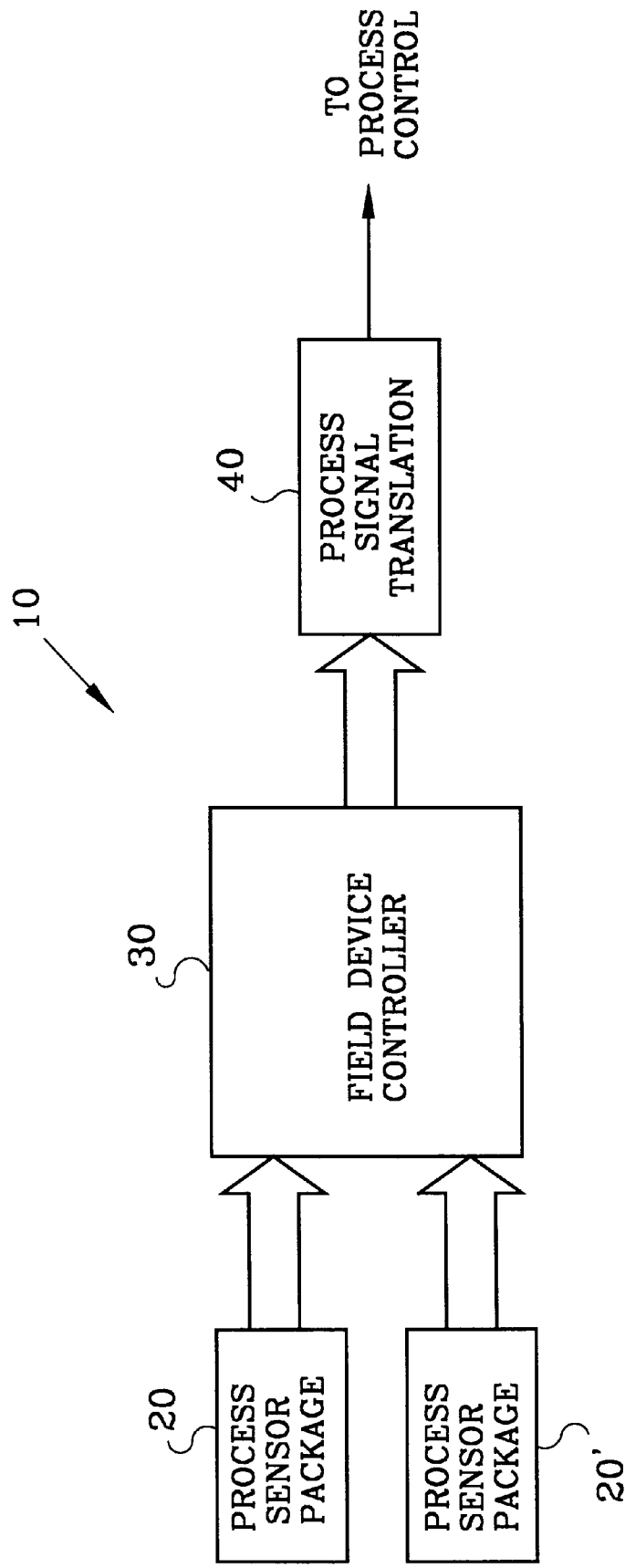
FIG. 1 is a schematic block diagram of the major components of an industrial process transmitter where the present invention used to advantage.

Turning to FIG. 1, the major components of a presently-known industrial process transmitter 10 are illustrated (hereinafter referred to as a process transmitter). The major components of the process transmitter include one or more process sensor packages 20, 20', a field device controller 30 and a process signal translation device 40. These three major components can be all housed together within a single housing, or the field device controller 30 and process signal translation device 40 housed within a single package and the process sensor packages 20, 20' located remotely. The process sensor packages 20, 20' each include a process specific sensor that is tasked to sense a particular aspect of the process being monitored or controlled, such as temperature, pressure, flow, etc.

The signals generated by the sensors 20, 20' are passed to a field device controller 30 where they are manipulated. The field device controller for this embodiment is contemplated to be a so-called "smart", or microprocessor-controlled, device. The microprocessor controller of this class of device controls the operation of the process transmitter 10 and is also tasked under programmed instructions loaded at the time of manufacture to manipulate the sensor signals received. For example, in a multi-variable process transmitter that is characterized or intended to be used to gather and transmit output signals indicative of the pressure of a process medium, temperature is also sensed since the temperature of the medium can affect the accuracy of the pressure readings. The programmed instructions loaded into the field device controller 30 not only control the selection and frequency of the polling of the sensor packages 20, 20', but also under control of an algorithm routine, can calculate the corrected pressure by factoring in the temperature of the process medium. Therefore, the process variable output by the field device controller 30 is the product of the algorithm routine.

The output of the field device controller 30 is next applied to a process signal translation device 40. As can be appreciated by those skilled in the art, a microprocessor-controlled field device controller is a digital device. Many existing process plant networks use the so-called two-wire 4-to-20-mA current loop for the transmission of process signals from various locations in the plant to a control room. The two-wire transmission system is also used to supply power to the process transmitter. The power supply section of the process transmitter is not shown in this embodiment but is well known to those skilled in the art. The process signal translation device 40 converts the digital signals output by field device controller 30 into an output signal that can be transmitted on the two-wire 4-to-20-mA current loop. Alternatively, in modern industrial plants that use digital local area networks the process signal translation 40 can be a digital signal packeting method that gathers, formats and packages the process signals developed by the field device controller 20 into message packets or other messaging forms required for transmission on the local area network.

Figure 2:
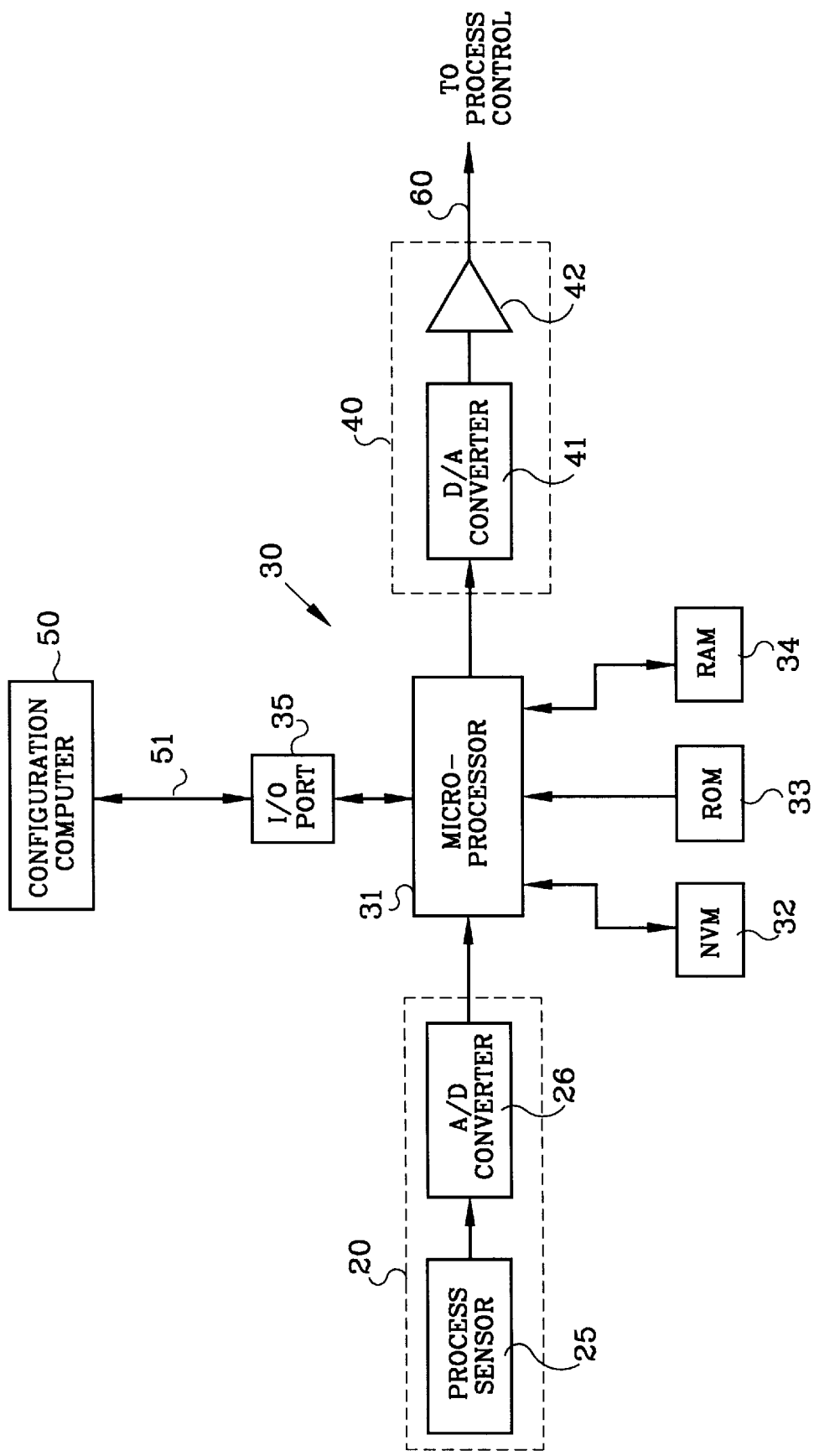
FIG. 2 is a schematic block diagram showing the key components of the field programmable industrial process transmitter in accordance to the present invention.

Turning now FIG. 2, the key components of the field programmable process transmitter in accordance to the present invention are illustrated. As can be seen, the process sensor package 20, is comprised of a process sensor 25 and an analog-to-digital converter 26. Sensor 25 is in communication with the measured process medium and continually outputs an analog voltage representation of the sensed activity. Sensor 25 if measuring, for example, the flow of a process medium such as a gas or liquid through a conduit or valve, would output an analog output voltage that represents the rate of flow observed by the sensor. The analog output signals from sensor 25 are converted into digital signals by analog-to-digital converter 26 before being applied to microprocessor 31. Field device controller 30 further includes a Read Only Memory (ROM) 33 that is normally programmed at the time of manufacture and contains operating instructions associated with the initiation, shut down, testing and general operating instruction of the microprocessor 31. A Random Access Memory (RAM) 34 is also included that is used to store on a temporary basis intermediate results of any operational routine or subroutine calculation.

A Non-Volatile Memory device (NVM) 32 is also connected to microprocessor 31. The NVM device 32 is of a type of device well known to those skilled in the art that is electrically erasable and programmable, or alterable, and is capable of retaining the data stored in the device if power is removed. Specifically, the invention contemplates the use of a solid-state memory device that can be altered by having either the entire memory or selected portions of the memory erased by an electric signal and new data stored in the erased portions. The most commonly used solid-state memory device having the aforementioned features is the Electrically Erasable Programmable Read Only Memory (EEPROM). However, other new Non-Volatile memory devices such as the so called solid-state Flash Memory or the Non-Volatile Random Access Memory (NVRAM), that combines in a single package an EEPROM and a static RAM, can be effectively used to perform the function of NVM 32. Additionally, low-power CMOS RAM devices that are normally associated with a battery backup supply can also be effectively used as the NVM 32. The NVM 32 is used by the present invention to accept and store therein operational programming downloaded to the industrial process transmitter in the field that characterizes and operationally distinguishes the process transmitter from other process transmitters and the operational routines that define operating behavior of the process transmitter within its character role.

The term characterize is used in the present invention to describe the character of the device. Defined as that which operationally distinguishes the process transmitter from other process transmitters, such as a transmitter that senses and transmits pressure signals from a transmitter that senses and transmits flow signals. The term functionality is used in the present invention to define an operating behavior of the process transmitter within its character role, such as in a temperature transmitter, the frequency that a temperature sensor is polled by the transmitter to gather process variable data.

The characterizing programming and the data defining the process transmitters functionality is downloaded to the field device controller 30 via an I/O port 35 that is connected to microprocessor 31. I/O port 35 connects the process transmitter to a configuration computer 50 via a digital line 51. The configuration computer 50 can be any one of a type of presently-known microprocessor-controlled devices, such as desk top, portable or hand held computer devices that can be manipulated by a user to enter characterizing programming or functionality-defining routines into the field device controller 30. The configuration computer 50 establishes a communications link to the microprocessor 31 via digital line 51 in any of the present forms known for communicating and transferring data between two digital devices. The link can be a local serial data link and, therefore, composed of a two-line conductor or a local parallel data link composed of a plurality of conductors.

Programming data and functional routines entered by the user and downloaded to the microprocessor 31 are finally loaded into NVM 32 and become a part of the operational programming of the process transmitter. If the sensors 25 connected to the field device controller 30 are tasked to read process flow, a user via the configuration computer can create new flow equations or algorithm routines that can calculate an output value that can factor in other variables, such as previously-sensed process variables, parameters, offsets, gains, etc. Additionally, the programmable process transmitter of the present invention can have its character easily changed in the field by downloading the appropriate operating programming and data subroutines to NVM 32 via configuration computer 50. By connecting the appropriate process sensor package 20, i.e. thermocouples, or temperature sensors, a process transmitter originally configured to measure flow can be changed to a temperature transmitter easily without the need to purchase and install a new process transmitter.

The value of a calculated or manipulated process variable is output to the process signal translation device 40 for conversion into a signal compatible with the signal network used in the plant. In FIG. 2, the plant signal network is the 4-to-20-mA current loop 60. The digital output value from microprocessor 31 is applied to a digital-to-analog converter where the digital signal is translated into an analog voltage for amplification by an amplifier 42 before being transmitted along current loop 60 to a process control or monitoring scheme. The process control scheme can be as simple as visually displaying the output value on an indicator, meter or CRT either locally in proximity of the process transmitter, or remotely in a control room. The output analog signal can also be transmitted to a local controller of an automated distributed process control system. The local controller gathers the output values from the process transmitters associated with the controller and is passed to the process control system. The process control system controls the process in accordance to the values so received.

Figure 2A:
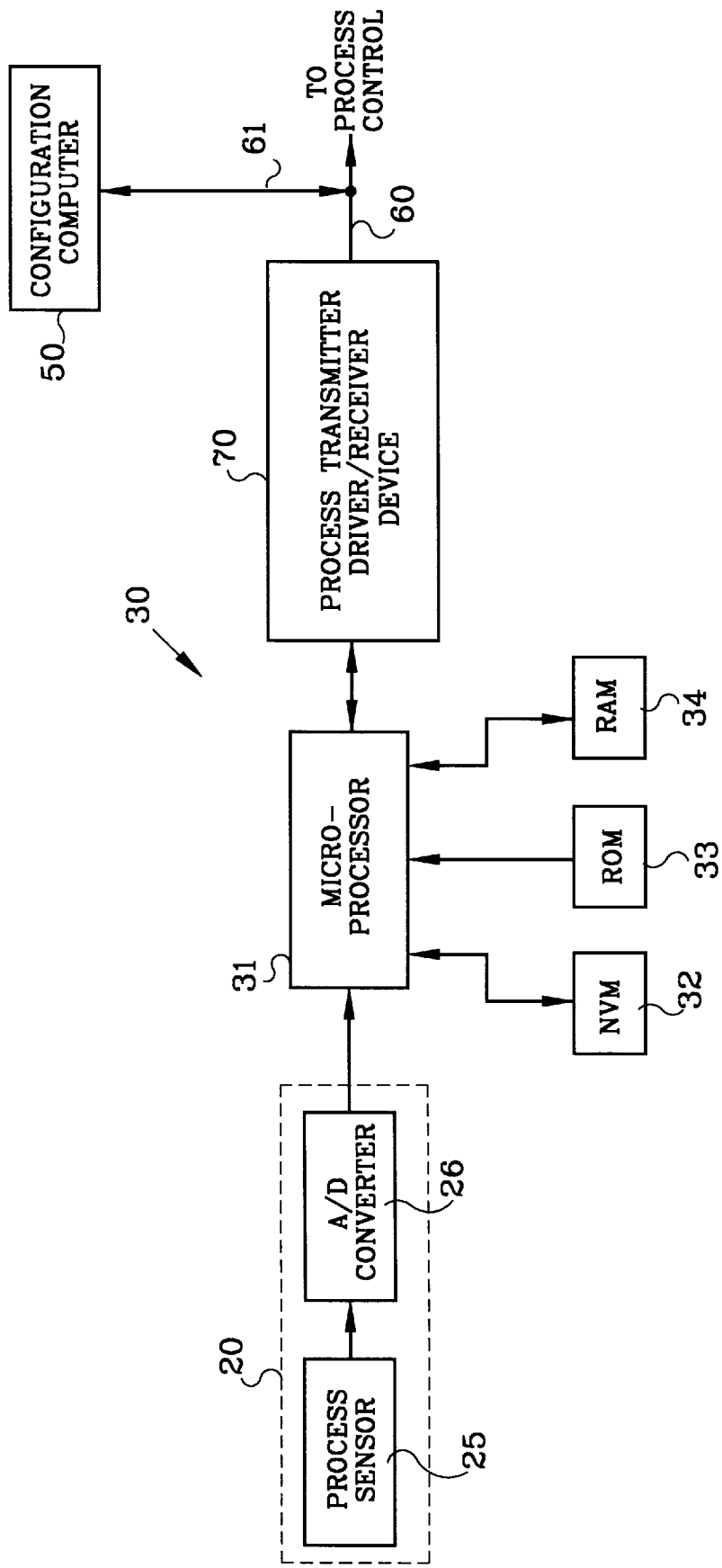
FIG. 2A is the schematic block diagram of FIG. 2, showing an alternative arrangement of linking the configuration computer to the process transmitter in accordance to the present invention.

Turning to FIG. 2A, an alternative arrangement of linking the configuration computer 50 to the process transmitter in accordance to the present invention is shown. There is known in the process industry a class of handheld devices used to communicate with process transmitters that can communicate digital and analog data over the so called two-wire 4-20-mA current loop. Such a device and the method of communication is taught by U.S. Pat. No. 4,520,488, entitled, "Communication System and Method", having a common assignee as the present invention and hereby incorporated by reference.

Using the communication method of the above-identified patent the configuration computer 50 can be connected anywhere along the so-called two-line current loop 60 via a communication line 61. The configuration computer 50 includes a driver/receiver circuit (not shown), as taught by the aforementioned U.S. Pat. No. 4,520,488, which introduces direct current variations in the two-line current loop 60, between pre-set current limits, with each variation representing a digital bit. The user-entered programming and data is applied to the two-wire current loop 60 via line 61 and received by an associated process transmitter driver/receiver device 70. The device 70 translates the direct current variations representing digital data and outputs the data to microprocessor 31. Microprocessor 31 then stores the downloaded programming and data into NVM 32.

Figure 3:
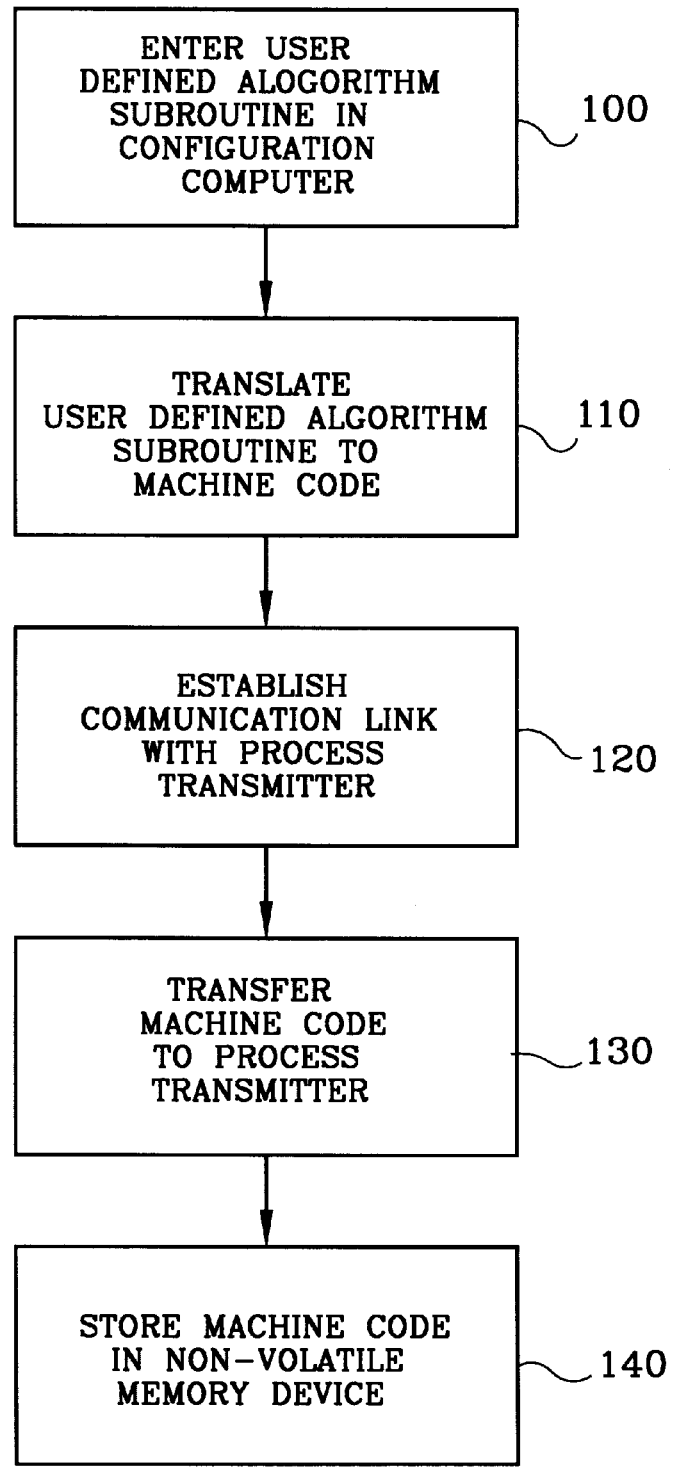
FIG. 3 is a block diagram of the steps involved in programming the process transmitter in accordance to the present invention.

Turning now to FIG. 3, a block diagram of the steps involved in programming the process transmitter in accordance to the present invention is illustrated. In order to simplify the explanation of the concept involved in the field programming of the process transmitter, the data to be entered will be explained as an algorithm routine. It will be well understood by those skilled in the art that other forms of data, such as operating instructions, characterization data, or the like, may be effectively downloaded by the method illustrated and the invention is not limited thereto.

A user utilizing the configuration computer 50 enters the algorithm routine to be downloaded into the computer 50 (block 100). The user may input this data using an associated input device (not shown). The input device can be one or more of the many devices presently known for inputting data and commands into a computer device; for example, a keyboard where the user manually enters via keystrokes the algorithm routine, a selection from a preloaded list of possible algorithm routine choices displayed on a CRT screen, and/or from magnetic media device such as a floppy disk drive, or the like.

Once the algorithm routine is entered in the configuration computer 50, the computer under control of an operating program converts the routine into machine code readable by microprocessor 31 (block 110). Next, the configuration computer 50 establishes a communications link with microprocessor 31 of the process transmitter (block 120). The microprocessor 31 upon receiving the request to establish the link from configuration computer 50 prepares to receive the download and sends an acknowledgment to configuration computer 50 to begin the transfer.

The now machine-code-translated algorithm routine is transmitted to process transmitter via line 51 (block 130) for a digital connection shown by FIG. 2 or line 61 to current loop 60 shown in FIG. 2A. The algorithm subroutine is then stored in a non-volatile memory storage device, in this embodiment NVM 32 (block 140).

The now-downloaded algorithm routine can replace a previously-downloaded routine or can be one of a plurality of routines stored in NVM 32 in a library. For example, if the process transmitter is configured as a flow transmitter, the library can include custom user-defined algorithm routines for mass and volume flow. Microprocessor 31 can access the routine library and use one of the custom flow algorithm routines stored thereat to manipulate the sensed process variables.

In particular process variable calculations, such as in the calculation of laminar flow, the calculation requires the downloading of algorithm routines that are long and mathematically intensive. Additionally, the available memory that a process transmitter can use is finite due to the requirement that it be powered from the 4-20-mA current loop. Therefore, if a plurality of such algorithm routines must be downloaded, sufficient memory may not be available to store all routines and their parameter data.

Figure 4:
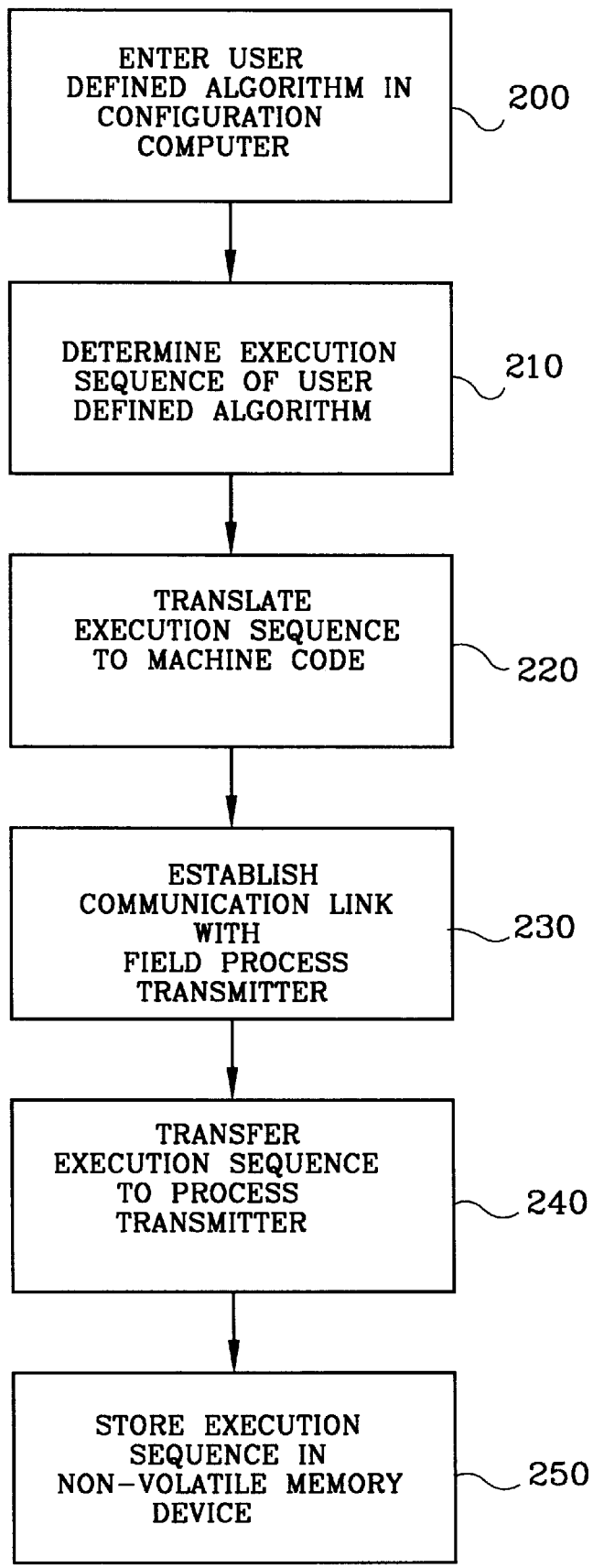
FIG. 4 is a block diagram of the of the steps involved in downloading userdefined algorithm routines to the process transmitter in a sequence of executable calls in accordance to the present invention.

Turning to FIG. 4, a method is shown for downloading user-defined algorithm routines to the process transmitter as a series of executable calls to functional subroutines. This method takes a user-entered algorithm routine and converts it into a series of cardinal calls in an executable sequence. The executable sequence corresponds to the steps required by the user-defined algorithm to solve the calculation. For example, if the algorithm includes an initial calculation that must be completed before the next calculation is made, such as in a mathematical formula where the addition or subtraction of two numbers is enclosed within a pair of parenthesis, these two numbers are calculated first before the next step of the calculation is made.

The field device controller 30 has stored in one of its memory devices a library of predefined function subroutines that are accessed by the executable sequence call in order to complete the calculation. For example, one of the function subroutines would require a previously-calculated dependent variable be added to a sensed process variable or to find the square root of sensed process variable. This library of function subroutines can be loaded into the ROM 33 or NVM 32 at the time of manufacture. Alternatively, the library of function subroutines can be downloaded to NVM 32 in the field using the method shown by FIG. 3.

A user utilizing the configuration computer 50 enters the algorithm routine and data to be downloaded into the configuration computer 50 (block 200). As previously the configuration computer 50, the computer determines the execution sequence of the algorithm, including the function subroutine that must be called and the variable and/or parameter data that will be used by the function subroutine in the function calculation (block 210). Alternatively, the user can manually determine the executable sequence of calls and can enter it into the computer 50 as he would the algorithm routine.

For example, in a user-defined and -entered algorithm (block 200):

$$Flow = Q = X_n = Func_n(X_1, X_2 \ldots, X_{n-1}; V_1, V_1 \ldots V_M; P_1, P_2, P_R)$$

The configuration computer would generate the following sequence of executable calls to functional subroutines (block 210).

1. $X_0 = Func_0(\tilde{X}_0, \tilde{V}_0, \tilde{P}_0)$
2. $X_1 = Func_1(\tilde{X}_1, \tilde{V}_1, \tilde{P}_1)$
3. $X_2 = Func_2(\tilde{X}_2, \tilde{V}_2, \tilde{P}_2) \ldots$ $(N+1) X_n = Func_n(\tilde{X}_n, \tilde{V}_n, \tilde{P}_n)$ where:

$Func_i$ is the function subroutine $\tilde{X}_i$ is a subset of previously calculated dependant variables to be used by $Func_i$ $\tilde{V}_i$ is a subset of the process variables to be used by $Func_i$ $\tilde{P}_i$ is a subset of the parameter used by $Func_i$ Configuration computer 50, under control of an operating program, converts the execution sequence into machine code readable by microprocessor 31 (block 220). Next the configuration computer 50 establishes a communications link with microprocessor 31 (block 230). The microprocessor 31 upon receiving the request to establish the link from configuration computer 50 prepares to receive the download and sends an acknowledgment to configuration computer 50 to begin the transfer. establish the link from configuration computer 50 prepares to receive the download and sends an acknowledgment to configuration computer 50 to begin the transfer.

The now machine-code-translated execution sequence is transmitted to the process transmitter (block 240) via line 51 for a digital connection and shown by FIG. 2, or line 61 for a 4-20-mA current loop as shown in FIG. 2A. The execution sequence is then stored in a non-volatile memory storage device, in this embodiment NVM 32 (block 250).

The now-downloaded execution sequence can replace a previously-downloaded algorithm routine or a previously-stored call sequence, or can be one of a plurality of executable sequences stored in NVM 32 in a library. The microprocessor executes the call sequence linearly by calling the function subroutine one by one in accordance to a first-to-last sequence. The required dependent, process variable and/or parameter is used by the function subroutine and the sequence continued until a last function call, which generates the final result and product for transmission to the process control system.

The present invention has been described with particular reference to the preferred embodiments thereof. It will be obvious that various changes and modifications can be made therein without departing from the spirit and scope of the invention as defined in the appended claims and characterized by a method used in an industrial process transmitter which includes entering a user-defined set of operating instructions in a configurations device and then translating the set of operating instructions into a format readable by a controller device that controls the operation of the industrial process transmitter. On establishment of a communication link between the configuration device and the industrial process transmitter, the operating instructions are transferred from the configuration device to the industrial process transmitter where they are stored in the alterable storage device, replacing any previously-stored sets of operating instructions. The controller device then uses the newly loaded set of operating instructions to collect, manipulate and transmit output signals representing the state of the industrial process.

What is claimed is:

1. In an industrial process transmitter used in an industrial process to collect, manipulate and transmit signals representing the state of said industrial process, said industrial process transmitter connected to a communication channel used in the transmission of output signals from the industrial process transmitter, said industrial process transmitter further including at least one alterable storage device having a first set of operating instructions stored therein, a controller device connected to said alterable storage device and receiver/transmitter means connected between said controller device and said communications channel and in accordance to said first set of operating instructions said controller device controls said industrial process transmitter to collect, manipulate and transmit signals representing the state of the industrial process, and a configuration device arranged to receive a user-defined second set of operating instructions and to establish a communications link between said configuration device and said controller device over said communication channel, a method for altering the character of said industrial process transmitter comprising the steps of:
    a) entering a second set of operating instructions in said configurations device;
    b) translating said second set of operating instructions into a format readable by said receiver/transmitter means;
    c) establishing a communications link between said configuration device and said controller device via said receiver/transmitter means and said communications channel;
    d) transferring said second set of operating instructions from said configuration device to said industrial process transmitter responsive to the establishment of said communications link; and
    e) storing said second set of operating instructions in said alterable storage device, replacing said first set of operating instructions, whereby said controller device controls said industrial process transmitter to collect, manipulate and transmit signals representing the state of said industrial process in accordance to said second set of operating instructions, altering the character of said industrial process transmitter.

2. The method as claimed in claim 1 wherein said second set of operating instructions comprises an operating program that controls the operation of said industrial process transmitter.

3. The method as claimed in claim 2 wherein said alterable storage device is a non-volatile solid-state memory device that can be electrically programmable.

4. The method as claimed in claim 3 wherein said controller device is a microprocessor.

5. The method as claimed in claim 4 wherein said configuration device includes means for entering data, and said step of entering a second set of operating instructions includes a user manipulating said means for entering data to enter said second set of operating instructions into said configuration device.

6. The method as claimed in claim 5 wherein said communication channel is a current circuit and said receiver/transmitter means receives and transmits digital data as direct current variations in the current circuit and said configuration device further includes means for transmitting and receiving digital data as direct current variations in the current circuit, connected to said current circuit said step of establishing a communications link further includes the steps of;
    a) sending a request to said microprocessor from said configuration device along said current circuit to prepare for the reception of said second set of operating instructions;
    b) sending an acknowledgment to said configuration device from said microprocessor along said current circuit to begin transmission of said second set of operating instructions;
    c) configuring said second set of operating instructions into a format compatible with said current circuit;
    d) transmitting said second set of operating instructions from said configuration device to said receiver/transmitter means over said current circuit, whereby said direct current variations are converted to digital data.

7. The method as claimed in claim 6 wherein said microprocessor stores the digital data representing said second set of operating instructions by electrically programming said non-volatile solid-state memory device.

8. In an industrial process transmitter used in an industrial process to collect, manipulate and transmit signals representing the state of said industrial process, said industrial process transmitter connected to a communication channel used in the transmission of output signals from the industrial process transmitter, said industrial process transmitter further including at least one alterable storage device having a first set of instructions stored therein, a controller device connected to said alterable storage device and receiver/transmitter means connected between said controller device and said communication channel and in accordance to said first set of instructions said controller device is arranged to manipulate and transmit the signals collected by said industrial process transmitter in accordance to said first set of instructions, and a configuration device arranged to receive a user-defined second set of instructions and to establish a communications link between said configuration device and said controller device, a method for altering the manipulation of the signals collected comprising the steps of:

a) entering a user-defined second set of instructions in said configurations device;

b) translating said second set of instructions into a format readable by said receiver/transmitter means;

c) establishing a communications link between said configuration device and said controller device via said receiver/transmitter means and said communications channel;

d) transferring said second set of user-defined instructions from said configuration device to said industrial process transmitter responsive to the establishment of said communications link; and e) storing said second set of instructions in said alterable storage device, whereby said controller device controls the manipulation of the signals collected by said industrial process transmitter in accordance to said second set of instructions.

9. The method as claimed in claim 8 wherein said second set of instructions comprises functional process routines that are used to generate an output signal in conjunction with the signals collected by the industrial process transmitter.

10. The method as claimed in claim 8 wherein said configuration device includes means for entering data, and said step of entering a second set of instructions includes a user manipulating said means for entering data to enter said second set of instructions into said configuration device.

11. The method as claimed in claim 8 wherein said communication channel is a current circuit and said receiver/transmitter means receives and transmits digital data as direct current variations in the current circuit and said configuration device further includes means for transmitting and receiving digital data as direct current variations in the current circuit connected to said current circuit, said step of establishing a communications link further includes the steps of;

a) sending a request to said controller device from said configuration device along said current circuit to prepare for the reception of said second set of instructions;

b) sending an acknowledgment to said configuration device from said controller device along said current circuit to begin transmission of said second set of instructions;

c) configuring said second set of instructions into a format compatible with said current circuit; and d) transmitting said second set of instructions from said configuration device to said receiver/transmitter means over said current circuit, whereby said direct current variations are converted to digital data.

12. The method as claimed in claim 11 wherein said controller device stores the digital data representing said second set of instructions by electrically programming said non-volatile solid-state memory device.

* * * * *